E. ROBLIN.
VEHICLE RUNNING GEAR.
APPLICATION FILED APR. 4, 1910.
969,080.
Patented Aug. 30, 1910.
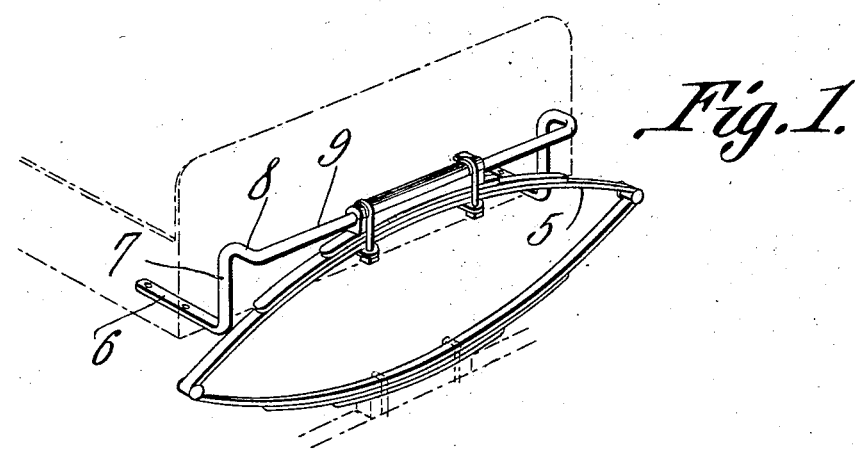
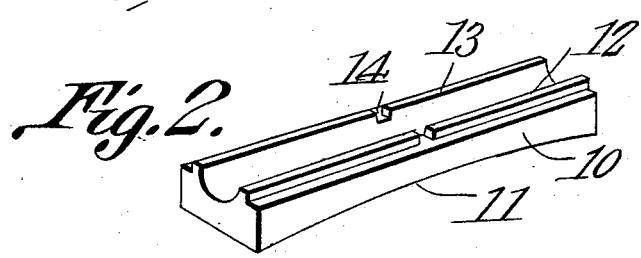
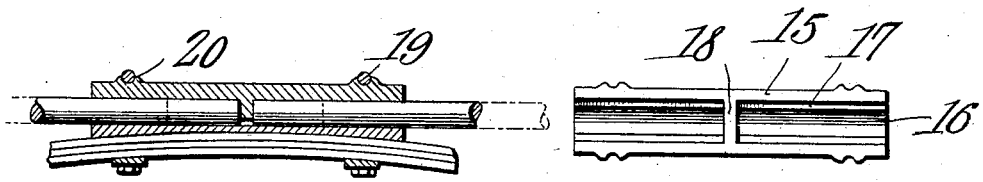
Witnesses
Inventor
Edwin Roblin.
By C. A. Snow & Co.
Attorney

UNITED STATES PATENT OFFICE.

EDWIN ROBLIN, OF LANSING, MICHIGAN.

VEHICLE RUNNING-GEAR.

969,080.   Specification of Letters Patent.   Patented Aug. 30, 1910.

Application filed April 4, 1910. Serial No. 553,249.

*To all whom it may concern:*

Be it known that I, EDWIN ROBLIN, a citizen of the United States, residing at Lansing, in the county of Ingham and State of Michigan, have invented a new and useful Vehicle Running-Gear, of which the following is a specification.

It is the object of the present invention to provide an improved construction of hanger for supporting a vehicle body from the running gear thereof.

The invention aims primarily to not only simplify the construction of such hangers, but also to render the same more substantial, and further to provide a hanger so constructed that it may be adapted to a wide or narrow vehicle body.

In the drawings,—Figure 1 is a perspective view of a hanger constructed in accordance with the present invention and illustrating the manner in which the same is to be applied to a vehicle. Fig. 2 is a similar view in detail of one member of the hanger. Fig. 3 is a bottom plan view of that member of the hanger which is associated with the member shown in Fig. 2. Fig. 4 is a vertical longitudinal sectional view taken in a line medially of the hanger, or more specifically speaking, the members thereof which are shown in Figs. 2 and 3.

In the drawings, there is shown, in dotted lines, the forepart of a vehicle body, for example, a buggy and there is also shown a bolster spring, which is indicated by the numeral 5.

The hanger of the present invention includes, in its structure, hanger arms, of which there are two, and each of these arms has an attaching portion 6 which is bolted or otherwise secured to the under side of the floor of the vehicle body in the manner shown in Fig. 1 of the drawings. From their attaching portions, the arms are bent to extend upwardly at right angles, as at 7, in advance of the dashboard of the vehicle body and thence forwardly, as at 8 at right angles, and finally laterally toward each other, as at 9.

As illustrated in the drawings, the lateral portions 9 of the arms are secured in a box provided for that purpose upon the upper bow of the spring 5. This box includes a body member which is clearly illustrated in Fig. 2 of the drawings, and is indicated by the numeral 10, its under side being longitudinally concaved, as at 11, so as to fit the said bow. This member 10 is formed in its upper side with a substantially semi-cylindrical groove or recess 12 which extends from end to end thereof and is further formed at each side of the recess or groove with an upstanding rib indicated by the numeral 13. For a purpose which will presently be explained, each rib 13 is formed at a point midway between its ends, with a notch indicated by the numeral 14. The box above referred to is completed by a cap member 15 which is disposed upon the body member and is substantially semi-cylindrical in form, it having in its under side, a substantially semi-cylindrical groove or recess 16 and being also formed in its annular face with rabbets 17 which receive the ribs 13 of the said body member and serve to prevent front or rear displacement of the said members of the box. In order to prevent lateral displacement of the said members, a web 18 is formed upon the cap member and extends across the groove thereof at a point midway between its ends, and the edge of this web seats in the notches 14. It will be observed that the lateral portions 9 of the hanger arms are inserted between the members of the box and at their terminals abut against opposite sides of the web 18, the members of the box being held in firm clamping relation with respect to the said portions 9 of the arms by means of clips 19 which are disposed upon the box at the ends thereof and embrace the bow of the spring 5. It will be observed that the cap member 15 of the box is formed upon its upper side at each end with spaced grooves 20 in which the bights of the clips engage and it will be readily understood that owing to this structure, displacement of the clips with respect to the box and the bow of the spring will be prevented.

The device is intended to be placed upon the market in a condition rendering it adaptable for attachment to a relatively wide vehicle body and where it is desired to attach it to a relatively narrow body, the lateral portions 9 of the arms of the device may be shortened by removing or cutting off the necessary part of their length.

One marked advantage of the device resides in the fact that when it is desired to apply the device to a vehicle having a relatively wide body, the device may be adjusted to the vehicle by loosening the nuts which secure the clips about the boxing for the arms 9, then sliding these arms out to the desired degree so as to properly separate or space the attaching portions 6, and then tightening the said nuts so as to hold the arms in the position to which they have been adjusted.

What is claimed is:

In a device of the class described, a box comprising a body formed with a longitudinally extending groove and at each side of the groove with a rib, said ribs being formed each with a notch, and a cap member fitted upon the body member and formed also with a groove and between its ends with a web extending across the groove, the said cap member being disposed upon the body member with the edge of its web seating in the said notches, hanger arms having portions inserted in the box in the grooves of its body and cap members and abutting at their ends against opposite sides of the web, and clips engaged upon the box at the ends thereof.

In testimony that I claim the foregoing as my own, I have hereto affixed my signature in the presence of two witnesses.

EDWIN ROBLIN.

Witnesses:
A. R. HARDY,
H. H. PULVER.